United States Patent
Kesavan et al.

(10) Patent No.: US 11,371,916 B1
(45) Date of Patent: Jun. 28, 2022

(54) PASSIVE SAMPLING OF AIRBORNE PARTICLES WITH THE AID OF NATURAL AIR FLOW

(71) Applicant: Combat Capabilities Development Command, Chemical Biological Center, Apg, MD (US)

(72) Inventors: Jana S Kesavan, Catonsville, MD (US); Nathan Kesavan, Catonsville, MD (US); Jerold R Bottiger, Aberdeen, MD (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 17/017,521

(22) Filed: Sep. 10, 2020

Related U.S. Application Data

(62) Division of application No. 15/921,349, filed on Mar. 14, 2018, now Pat. No. 10,775,279.

(51) Int. Cl.
*G01N 1/22* (2006.01)

(52) U.S. Cl.
CPC ......... *G01N 1/2205* (2013.01); *G01N 1/2273* (2013.01); *G01N 2001/2223* (2013.01); *G01N 2001/2276* (2013.01)

(58) Field of Classification Search
CPC .................................................... G01N 1/2205
See application file for complete search history.

(56) References Cited

U.S. PATENT DOCUMENTS

| | | | | |
|---|---|---|---|---|
| 5,651,810 | A * | 7/1997 | Flaherty | B01D 46/0091 95/287 |
| 2003/0106555 | A1* | 6/2003 | Tovey | A61M 15/085 128/205.27 |
| 2008/0041138 | A1* | 2/2008 | Marra | G01N 1/2205 73/31.02 |
| 2013/0220034 | A1* | 8/2013 | Peters | G01N 1/2273 73/863.22 |
| 2016/0050984 | A1* | 2/2016 | Ward | A41D 1/04 2/102 |
| 2019/0250076 | A1* | 8/2019 | Tsai | G01N 1/2205 |

* cited by examiner

*Primary Examiner* — Clayton E. LaBalle
*Assistant Examiner* — Dennis Hancock
(74) *Attorney, Agent, or Firm* — Ulysses John Biffoni

(57) ABSTRACT

An apparatus for passive sampling of airborne particles such as those found in an aerosol is disclosed. The passive sampler is designed to take advantage of natural air flow to collect airborne particles, such as those contained in an aerosol, for subsequent analysis. The passive sampler increases the sampling efficiency for diffusion and electrostatic collection of particles by using natural airflow or movement to bring particles closer to the deposition surface. Alternately charged electret filters further increase the sampling efficiency.

13 Claims, 4 Drawing Sheets

PASSIVE SAMPLING OF AIRBORNE PARTICLES WITH THE AID OF NATURAL AIR FLOW

CROSS REFERENCE TO RELATED APPLICATIONS

Figure 1:
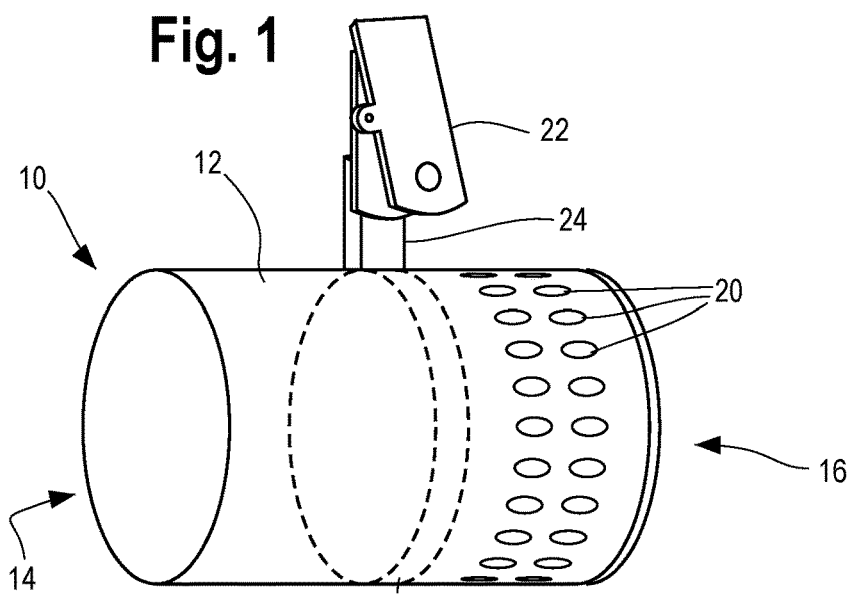

This application is a divisional application of U.S. patent application Ser. No. 15/921,349 filed on Mar. 14, 2018, now U.S. Pat. No. 10,775,279, which is commonly assigned.

GOVERNMENT INTEREST

The invention described herein may be manufactured, used, and/or licensed by or for the United States Government.

FIELD OF THE INVENTION

The present invention relates to airborne particle sampling systems and more particularly to passive samplers using natural airflows.

BACKGROUND

The invention relates generally to passive samplers and more particularly to passive samplers with improved sampling efficiency for solid and liquid particles in air.

Gases and vapors are made up of very small molecules, on the order of angstroms.

Because of the small size, gases and vapors are have a high diffusion coefficient and move easily through the air. In contrast, aerosols are typically liquid droplets or solid particulates that are on the order of microns, thus they have a lower diffusion coefficient and tend to settle due to gravity instead of floating indefinitely like a vapor or gas. Clouds, dust storms, smoke, diesel exhaust, pollen, etc are all examples of aerosols. Biological particles such as bacteria and viruses can also form aerosols. Because of their different sizes and behaviors in the environment, particles in air require different sampling techniques than gases and vapors There is a need for improved collection of particles from a variety of environments. Generally, there are two types of samplers, active and passive. In active sampling, airborne particles are actively collected by using pumps to pull aerosols through samplers that contain filters or other impaction surfaces. Active samplers are efficient in collecting particles because of the high airflow that can be achieved by a pump. Particles are collected using mechanisms such as impaction, interception, filtration, and diffusion. However, active samplers require a power source and some field locations may not have electricity. In addition, battery power may not be adequate for long sample durations. Another drawback of active samplers is the extra weight and noise for someone carrying a personal active sampler.

Due to the weight and noise of active samplers, passive sampling methods are often preferred for personal use. However, passive samplers are most effective for gasses and vapor because of their high diffusion coefficient. Although small particles in an aerosol may be sampled using a passive sampler, the sampling efficiency is low. Passive sampling of airborne particles may be accomplished by taking advantage of the settling feature of aerosol particles by placing Petri-dishes, microscope slides or sampling surfaces on the floor. Larger particles can be more efficiently collected by their settling; however, this is not a good method for smaller particles such as single spore bacteria and small clusters. It can also require a long time period to gather sufficient particles for analysis. In addition, determining aerosol exposure to a person working in different locations requires a sampler placed on that person to accurately quantify the exposure to that person.

Thus, a need exists for a passive sampler that is convenient for personal use, and has a high sampling efficiency for the micron-sized particles typically found in an aerosol. Further, there is a need for a passive sampler that takes advantage of natural ambient air currents or air flows caused by motion of a person wearing the sampler. A passive sampler can also be attached to a moving object (vehicle) or attached to a stationary object in a moderate to high air flow environment.

SUMMARY

The invention encompasses a passive sampler designed to take advantage of natural air flow to collect airborne particles, such as those contained in an aerosol, for subsequent analysis. The passive sampler increases the sampling efficiency for diffusion and electrostatic collection of particles by bringing the particles closer to the deposition surface.

DESCRIPTION OF THE DRAWINGS

Features of example implementations of the invention will become apparent from the description, the claims, and the accompanying drawings in which:

FIG. 1 depicts a passive aerosol sampler according to a first embodiment of the invention.

FIG. 2 depicts a passive aerosol sampler according to a second embodiment of the invention.

FIG. 3 depicts a cutaway view of the sampler of FIG. 2.

FIG. 4 depicts a cross-sectional view of the sampler of FIG. 2.

FIGS. 5A-5F depict a variety of ways to attach a passive sampler according to the present invention.

FIG. 6 depicts the passive aerosol sampler embodiment having a cuboid body.

DETAILED DESCRIPTION

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

FIG. 1 depicts a first embodiment of a passive sampler 10 according to the invention. A generally cylindrical body 12 is open on both ends 14 and 16. A filter 18 is located generally at a midpoint of body 12. Air holes, represented at 20, are located around the circumference of body 12 close to end 16. One of ordinary skill in the art would understand that filter 18 could be located at any point along body 12 and that air holes 20 could have a variety of shapes and configurations other than those depicted. Further although body 12 is shown as a cylinder, it could also have a square, rectangular or another shape as a cross-section. In an embodiment, body 12 has a cross-sectional diameter of approximately 20 mm to greater than 100 mm. In a further embodiment, body 12 has a cross-sectional diameter of approximately 47 mm.

Passive sampler 10 may be attached to a person's clothing or equipment through the use of clip 22 which is attached to body 12 by strap 24. Although a clip is shown, one of ordinary skill in the art would understand that other means of attachment could be used, for example, hook-and-loop tape, pins, magnets, etc. Air holes 20 take advantage of natural ambient air currents of air flows caused by motion of a person wearing the sampler.

Figure 2:
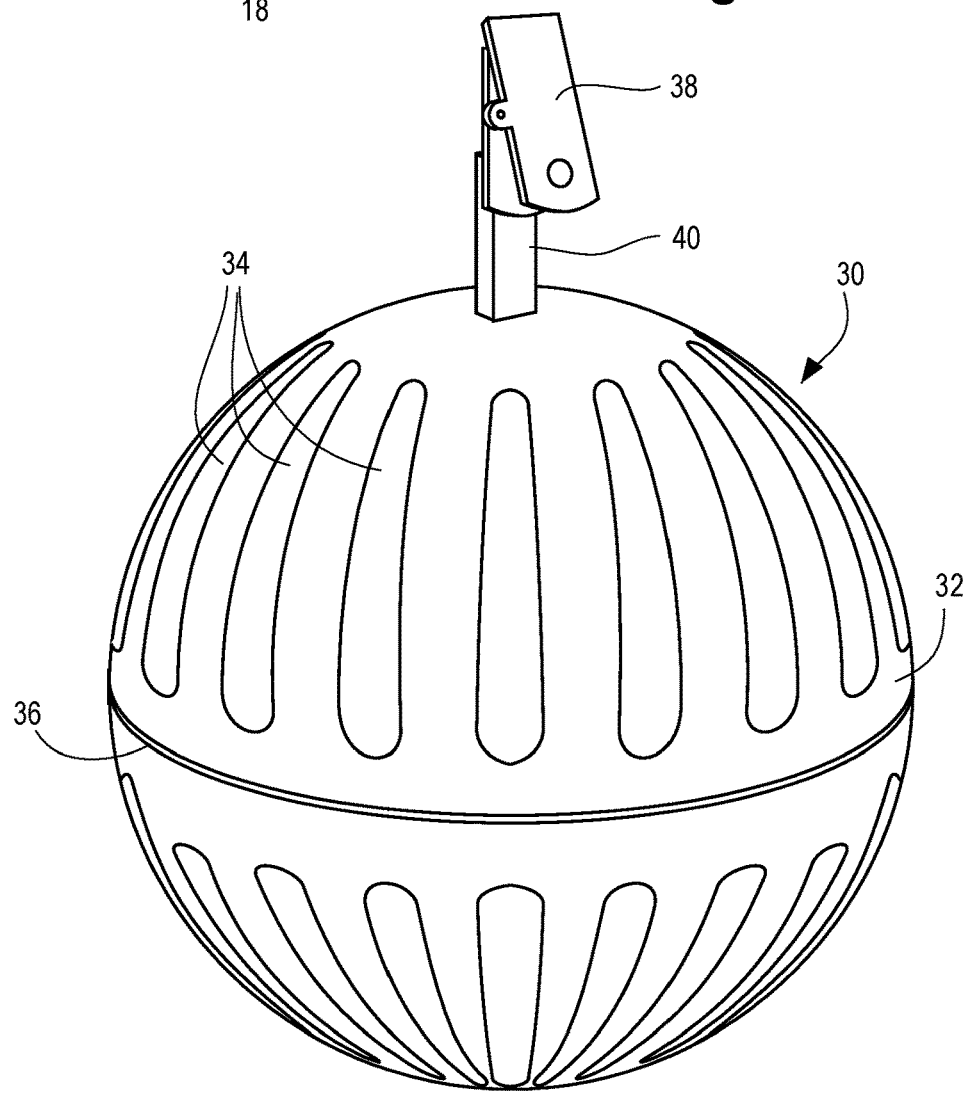

FIG. 2 depicts a second embodiment of the invention. Passive sampler 30 has a generally spherical body 32. A plurality of air holes as represented at 34 extends around the body. One of ordinary skill in the art would understand that air holes 34 may have a variety of shapes and configurations other than those depicted. In an embodiment, body 32 is separable along midline 36 into two hemispheres. This allows the insertion of filters inside body 32 when the hemispheres are separated. One of ordinary skill in the art would understand that sphere body 32 could be separated along a vertical midline, or other locations as needed to accommodate filters. Air holes 34 take advantage of natural ambient air currents of air flows caused by motion of a person wearing the sampler.

Passive sampler 30 may be attached to a person's clothing or equipment through the use of clip 38 which is attached to body 32 by strap 40. Although a clip is shown, one of ordinary skill in the art would understand that other means of attachment could be used, for example, hook-and-loop tape, pins, magnets, etc. One of ordinary skill in the art would also understand that passive sampler 30 may be shaped as a flat disk. In an embodiment, body 32 has a diameter of approximately 47 mm at midline 36, although a variety of sizes could be used, for example, in the range of 10 mm to greater than 100 mm.

Figure 3:
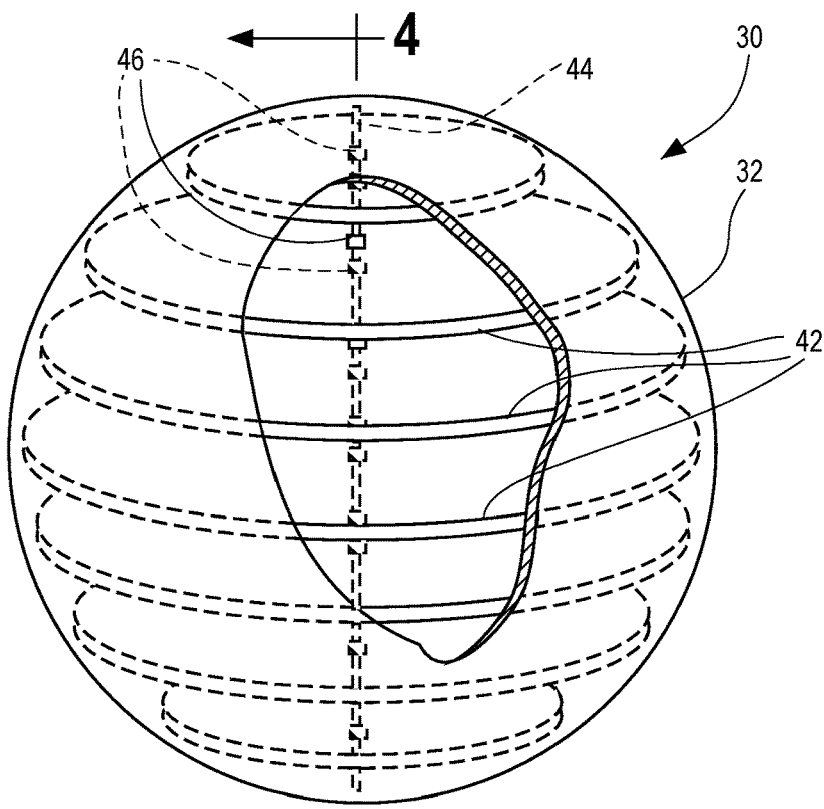

A cutaway view of the sampler of FIG. 2 is shown in FIG. 3. For ease of illustration, air holes 34, clip 38 and strap 40 are not shown. Body 32 encloses a plurality of filters, represented at 42. Although 7 filters are shown, any number could be used depending on the filter material and size of body 32. Filters 42 are stacked on center pole 44 which extends across a diameter of body 32 and perpendicularly to filters 42. Filters are held at a separation of approximately 1 mm by spacers 46. Although a single center pole is shown, multiple poles may be used in addition to or in place of the center pole. Additional poles would be parallel to center pole 44 in FIG. 3 and spaced evenly around a circumference of the sphere to provide additional stability to the filters. The filter materials used are those intended for filtering of airborne particles and aerosols such as high efficiency particulate air (HEPA) filters.

Figure 4:
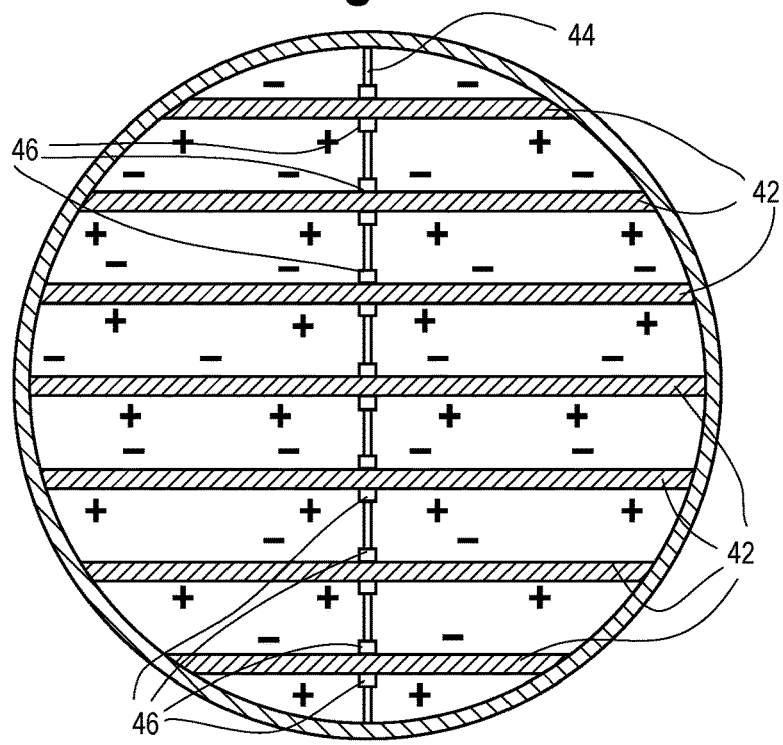

A cross-sectional view of passive sampler 30 is shown in FIG. 4. In an embodiment, filters 42 are uniformly charged electret filters with an opposite charge on adjacent surfaces as shown by the + and − symbols. In other words, the filters are placed in alternating orientations from one side of the sampler to the other. Using the charge properties of particles and the charged collection surface enhances collection efficiency. Ferroelectric polymer films or appropriate other material can be used as the charged collection surface. As described above for FIG. 3, center pole 44 holds filters 42 approximately 1 mm apart through the use of spacers 46. In an embodiment, filters may be separated by a range of approximately 1 to 6 mm. Although FIG. 4 shows two spacers on either side of each filter 44, one of ordinary skill in the art would understand that a single spacer could be used between each filter. In addition, spacers 46 may be manufactured separately then added to center pole 44, or integrally manufactured as part of central pole 44, for example.

Figure 5A:
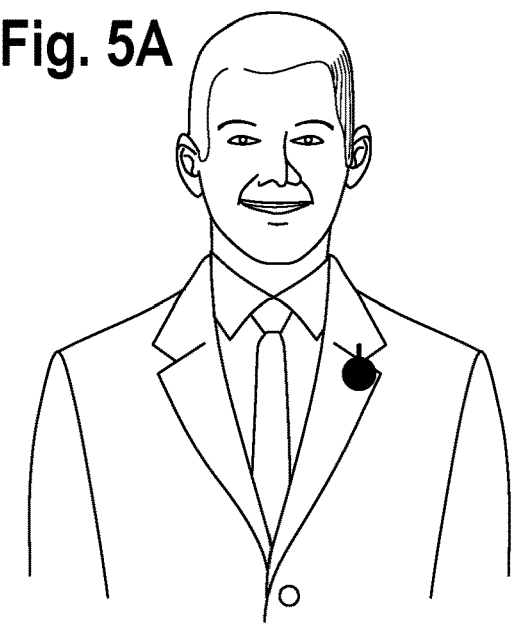
Figure 5B:
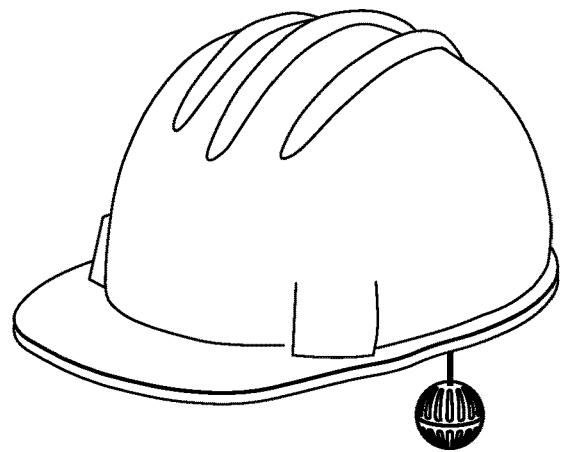
Figure 5C:
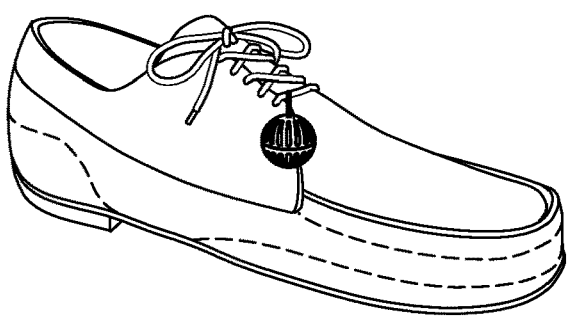
Figure 5D:
Figure 5E:
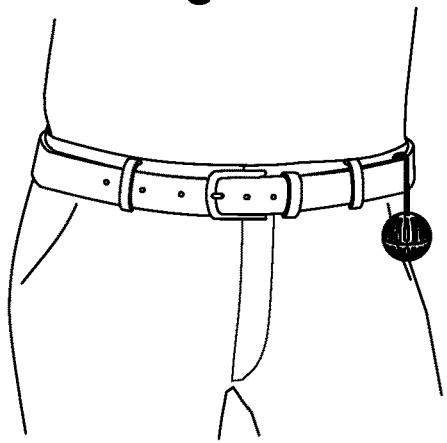
Figure 5F:
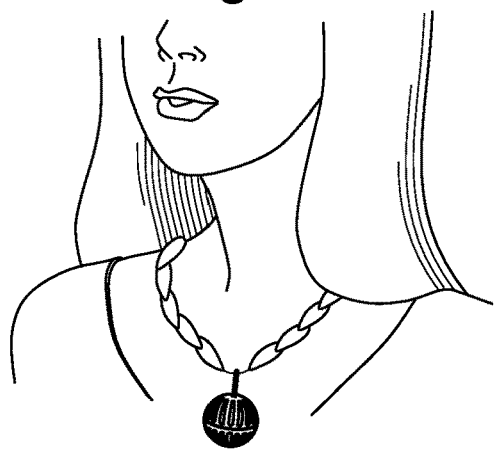
Figure 6:
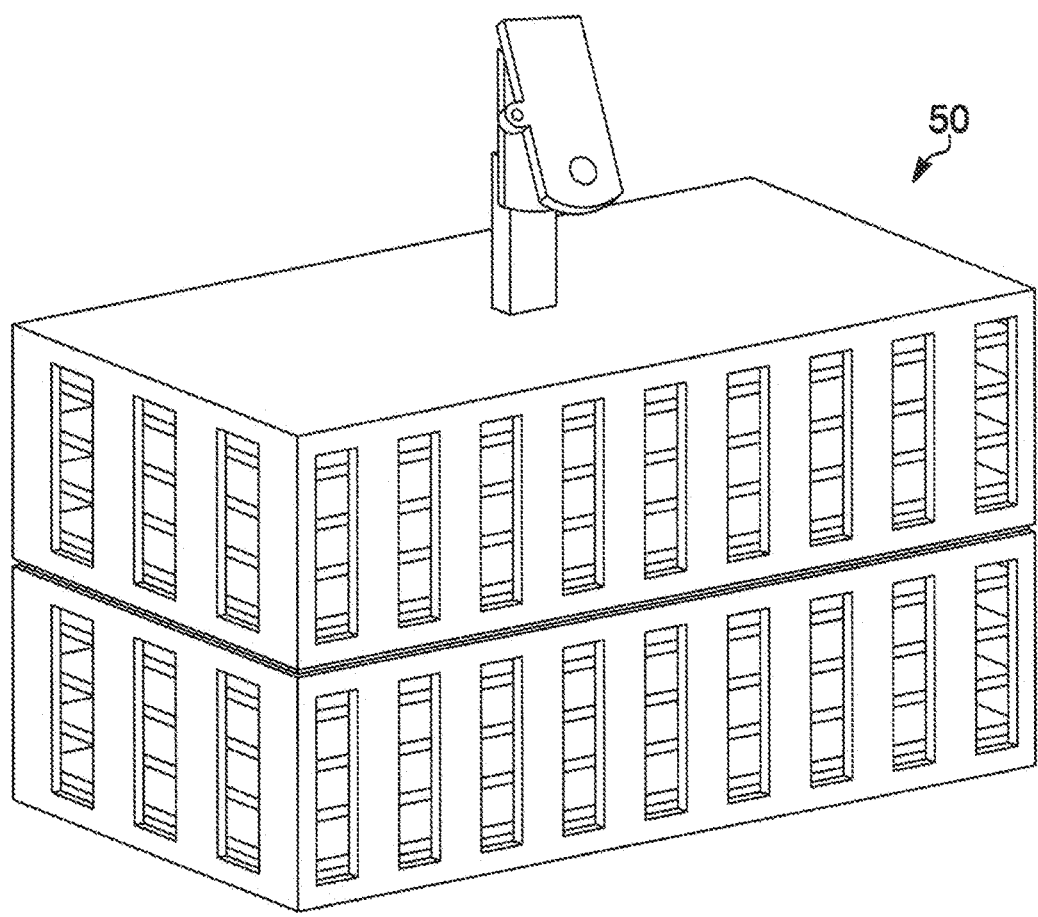

A passive sampler may be attached to a person's clothing or equipment in a variety of ways, as shown in FIGS. 5A-5F. A clip mechanism similar to that shown in FIGS. 1 and 2 is used in FIGS. 5A, 5B, 5C and 5E. As an alternative, the inventive passive sampler may be made in a size small enough to function as an caning (FIG. 5D) or pendant (FIG. 5F). As noted above, other attachment mechanisms may also be used, for example, hook-and-loop tape, pins or magnets.

If used and unless otherwise stated, the terms "upper," "lower," "front," "back." "over." "under," and similar such terms are not to be construed as limiting the invention to a particular orientation. Instead, these terms are used only on a relative basis. The apparatus in one example comprises any (e.g., horizontal, oblique, or vertical) orientation, with the description and figures herein illustrating one example orientation of the apparatus, for explanatory purposes.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A passive sampler for capturing airborne particles for analysis, comprising:
    a generally cylindrical body, said cylindrical body having a cross-section with a diameter and a longitudinal axis with a length, said cylindrical body open at both ends;
    one or more filters enclosed within said body at a point along the longitudinal axis and parallel to the cross-section of the cylindrical body;
    a plurality of openings around the circumference of the cylindrical body; and
    an attachment mechanism for attaching the passive sampler to a surface; and wherein said passive sampler captures airborne particles by ambient air entering the sampler through said plurality of openings only through the natural movement of ambient air or the movement of the passive sampler when attached to a moving object or person.

2. The passive sampler of claim 1, wherein the one or more filters are electret filters.

3. The passive sampler of claim 1, wherein the diameter of the cross-section is 20 to 100 millimeters.

4. The passive sampler of claim 3, wherein the diameter of the cross-section is approximately 47 millimeters.

5. The passive sampler of claim 1, wherein the plurality of openings are distributed around the entire surface of the cylindrical body.

6. The passive sampler of claim 1, wherein the attachment mechanism is a clip.

7. The passive sampler of claim 1, wherein the attachment mechanism is a magnet.

8. The passive sampler of claim 1, wherein the attachment mechanism is hook-and-loop tape.

9. A passive sampler for capturing airborne particles for analysis, comprising:
    a generally cubic or cuboid shaped body;
    one or more filters enclosed within said body;
    a plurality of openings along the surface of the cubic or cuboid shaped body; and an attachment mechanism for attaching the passive sampler to a surface; and wherein said passive sampler captures airborne particles by ambient air entering the sampler through said plurality of openings only through the natural movement of ambient air or the movement of the passive sampler when attached to a moving object or person.

10. The passive sampler of claim 9, wherein the one or more filters are electret filters.

11. The passive sampler of claim 9, wherein the attachment mechanism is a clip.

12. The passive sampler of claim 9, wherein the attachment mechanism is a magnet.

13. The passive sampler of claim 9, wherein the attachment mechanism is hook-and-loop tape.

\* \* \* \* \*